United States Patent
Shi et al.

(10) Patent No.: US 11,106,973 B2
(45) Date of Patent: Aug. 31, 2021

(54) METHOD AND SYSTEM FOR BIT-DEPTH REDUCTION IN ARTIFICIAL NEURAL NETWORKS

(71) Applicant: Hong Kong Applied Science and Technology Research Institute Company, Limited, Hong Kong (HK)

(72) Inventors: Chao Shi, Hong Kong (HK); Luhong Liang, Hong Kong (HK); Kwok Wai Hung, Hong Kong (HK); King Hung Chiu, Hong Kong (HK)

(73) Assignee: Hong Kong Applied Science and Technology Research Institute Company Limited, Hong Kong (HK)

(*) Notice: Subject to any disclaimer, the term of this patent is extended or adjusted under 35 U.S.C. 154(b) by 1256 days.

(21) Appl. No.: 15/415,810

(22) Filed: Jan. 25, 2017

(65) Prior Publication Data
US 2017/0270408 A1 Sep. 21, 2017

Related U.S. Application Data

(60) Provisional application No. 62/309,239, filed on Mar. 16, 2016.

(51) Int. Cl.
*G06N 3/06* (2006.01)
*G06N 3/08* (2006.01)
(Continued)

(52) U.S. Cl.
CPC .............. *G06N 3/08* (2013.01); *G06N 3/04* (2013.01); *G06N 3/063* (2013.01)

(58) Field of Classification Search
CPC ............................................. G06N 3/02–105
(Continued)

(56) References Cited

U.S. PATENT DOCUMENTS

| 4,918,618 A | 4/1990 | Tomlinson, Jr. |
| 5,430,830 A | 7/1995 | Frank et al. |

(Continued)

FOREIGN PATENT DOCUMENTS

| CN | 103345656 A | 10/2013 |
| CN | 103530689 A | 1/2014 |

(Continued)

OTHER PUBLICATIONS

Ji et al. "Reducing weight precision of convolutional neural networks towards large-scale on-chip image recognition." 2015, Proceedings of SPIE.*

(Continued)

*Primary Examiner* — Jue Louie
(74) *Attorney, Agent, or Firm* — Stuart T. Auvinen; gPatent LLC (57) ABSTRACT

A bit-depth optimization engine reduces the hardware cost of a neural network. When training data is applied to a neural network during training routines, accuracy cost and hardware costs are generated. A hardware complexity cost generator generates costs for weights near bit-depth steps where the number of binary bits required to represent a weight decreases, such as from $2^N$ to $2^N-1$, where one less binary bit is required. Gradients are generated from costs for each weight, and weights near bit-depth steps are easily selected since they have a large gradient, while weights far away from a bit-depth step have near-zero gradients. The selected weights are reduced during optimization. Over many cycles of optimization, a low-bit-depth neural network is generated that uses fewer binary bits per weight, resulting in lower hardware costs when the low-bit-depth neural network is manufactured on an Application-Specific Integrated Circuit (ASIC).

20 Claims, 9 Drawing Sheets

(51) Int. Cl.
*G06N 3/063* (2006.01)
*G06N 3/04* (2006.01)

(58) Field of Classification Search
USPC ...................................................... 706/15–44
See application file for complete search history.

(56) References Cited

U.S. PATENT DOCUMENTS

| | | |
|---|---|---|
| 5,644,681 A | 7/1997 | Takahashi et al. |
| 5,768,422 A | 6/1998 | Yaeger |
| 5,845,051 A | 12/1998 | Oh |
| 9,224,089 B2 | 12/2015 | Majumdar et al. |
| 2015/0170020 A1 | 6/2015 | Garimella |
| 2016/0086078 A1 | 3/2016 | Ji et al. |
| 2016/0328645 A1 | 11/2016 | Lin et al. |
| 2016/0328646 A1 | 11/2016 | Lin et al. |
| 2016/0328647 A1* | 11/2016 | Lin ........................ G06F 17/11 |

FOREIGN PATENT DOCUMENTS

| | | |
|---|---|---|
| CN | 104751842 A | 7/2015 |
| WO | WO1991000591 | 1/1991 |
| WO | WO1991000591 A1 | 1/1991 |
| WO | WO2012054109 A1 | 4/2012 |
| WO | WO2013044143 A1 | 3/2013 |
| WO | WO2016037351 | 3/2016 |
| WO | WO2016037351 A1 | 3/2016 |

OTHER PUBLICATIONS

Park et al. "FPGA based implementation of deep neural networks using on-chip memory only", Feb. 4, 2016, arXiv: 1602.01616v1.*
Bao, Jian, "Research and Application of Neural Networks with Limited Precision Weights", Thesis, Jul. 15, 2011, p. 1-120 plus 11 Intro. pages with English Abstiact.
ISR and Written Opinion, PCT/CN2017/073070, dated Apr. 11, 2017.

* cited by examiner

METHOD AND SYSTEM FOR BIT-DEPTH REDUCTION IN ARTIFICIAL NEURAL NETWORKS

RELATED APPLICATION

This application claims the benefit of U.S. Provisional Patent Application No. 62/309,239, filed on Mar. 16, 2016 and titled "Deep Learning Neural Networks Optimization using Hardware Cost Penalty", hereby incorporated by reference.

FIELD OF THE INVENTION

This invention relates to Neural Networks, and more particularly to optimization of weight sizes.

BACKGROUND OF THE INVENTION

Artificial Neural Networks are especially useful for processing large amounts of data in complex ways that are hard to define using traditional computer programs. Instead of being programmed with instructions, training data is input to a neural network and compared to the expected output, then adjustments are made within the neural network and the training data is again processed and outputs compared to generate further adjustments to the neural network. After many such training cycles, the neural network is altered to efficiently process data similar to the training data and expected outputs. Neural networks are an example of machine learning, since the neural network learns how to generate the expected outputs for the training data. Real data similar to the training data can then be input to the neural network to process live data.

Figure 1:
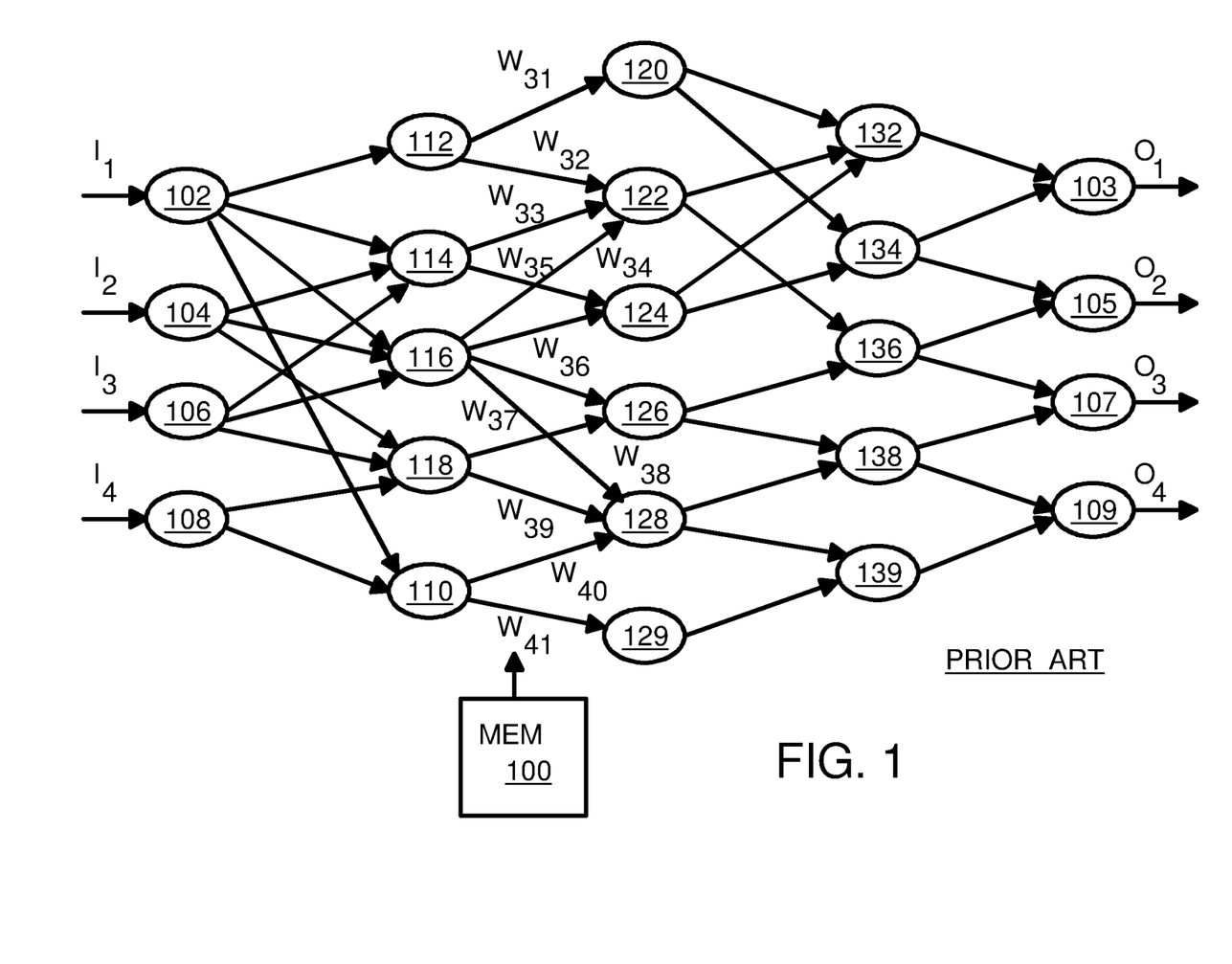
FIG. 1 illustrates a prior art neural network.

FIG. 1 illustrates a prior art neural network. Input nodes 102, 104, 106, 108 receive input data $I_1, I_2, I_3, \ldots I_4$, while output nodes 103, 105, 107, 109 output the result of the neural network's operations, output data $O_1, O_2, O_3, \ldots O_4$. Three layers of operations are performed within this neural network. Nodes 110, 112, 114, 116, 118, each take inputs from one or more of input nodes 102, 104, 106, 108, perform some operation, such as addition, subtraction, multiplication, or more complex operations, and send and output to nodes in the second layer. Second-layer nodes 120, 122, 124, 126, 128, 129 also receive multiple inputs, combines these inputs to generate an output, and sends the outputs on to third-level nodes 132, 134, 136, 138, 139, which similarly combine inputs and generate outputs.

The inputs at each level are typically weighted, so weighted sums (or other weighted operation results) are generated at each node. These weights can be designated $W_{31}, W_{32}, W_{32}, W_{33}, \ldots W_{41}$, etc., and have their values adjusted during training. Through trial and error or other training routines, eventually higher weights can be given for paths that generate the expected outputs, while smaller weights assigned to paths that do not generate the expected outputs. The machine learns which paths generate the expected outputs and assigns high weights to inputs along these paths.

These weights can be stored in weights memory 100. Since many neural networks have many nodes, there may be many weights to store in weights memory 100. Each weight may require multiple binary bits to represent a range of possible values for that weight. Weights often require 8 to 16 bits. The size of weights memory 100 often scales with the overall size and complexity of the neural network.

Figure 2:
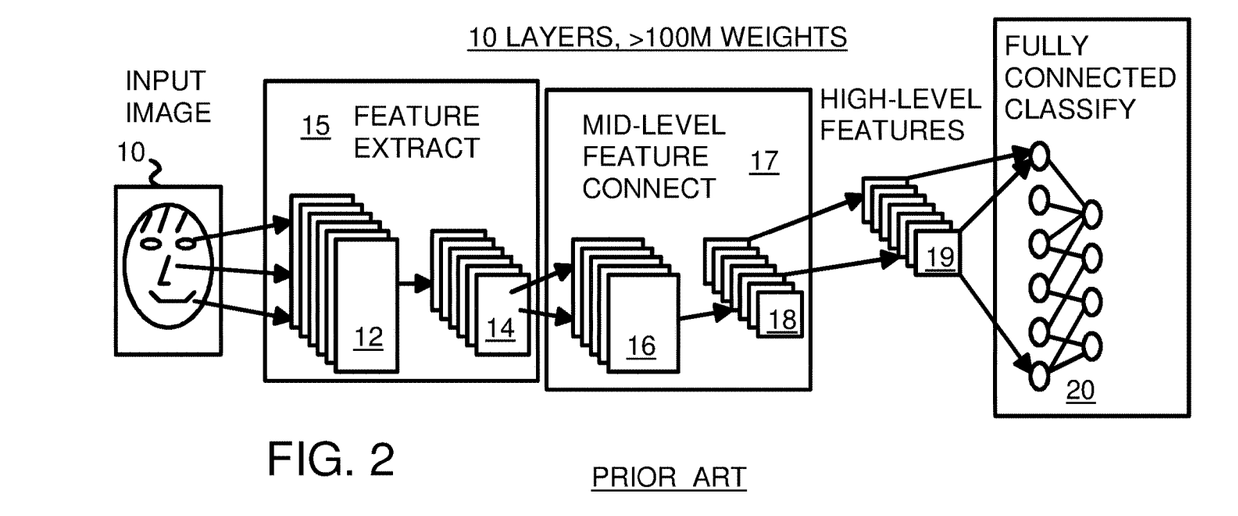
FIG. 2 shows a neural network used for facial recognition.

Deep neural networks have many layers of nodes and are often used for applications such as object classification, speech recognition, sentiment analysis, image recognition, facial detection, and other graphics processing. FIG. 2 shows a neural network used for facial recognition. Image input 10 may be extracted from a larger image, such as by software that isolates the faces of people. Feature extractor 15 performs low-level feature extraction, pooling, and down-sampling. For example, facial features such as eyes and mouths can be identified and extracted as extracted features 12. These extracted features 12 are pooled and down sampled to generate outputs 14.

Mid-level feature connector 17 examines the down sampled extracted features and generates connections 16 and mid-level features 18 which can then be used to generate high-level features 19. Classifier 20 classifies and fully connects the features so that the facial features can be output.

Such facial detection may by implemented using a neural network with 10 layers with many nodes. Over 100 million weights are used by the neural network.

Figure 3:
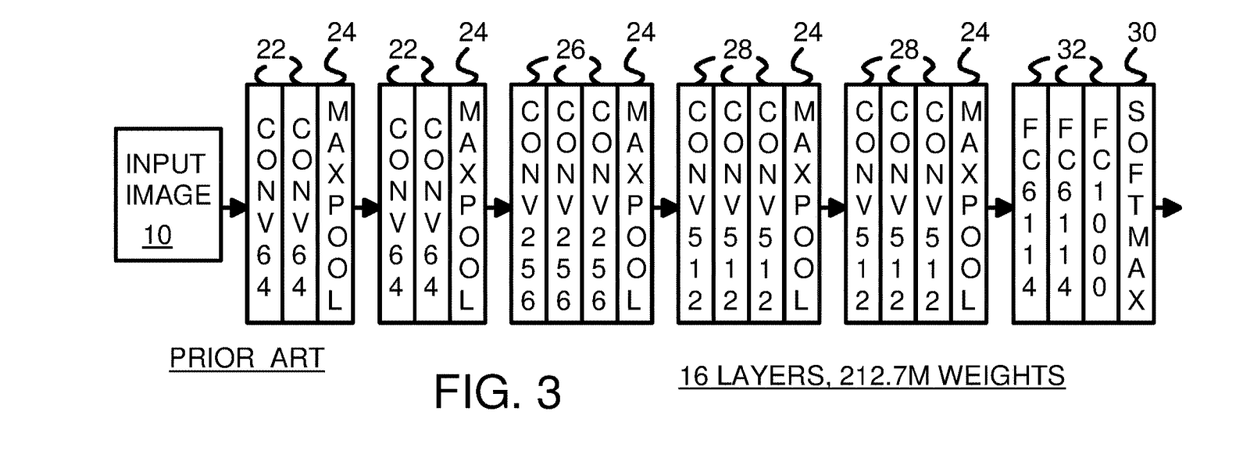
FIG. 3 shows a neural network implementing an image recognition processor.

FIG. 3 shows a neural network implementing an image recognition processor. Input image 10 may contains many features, such as several people, background and foreground objects, and several frames. Various layers of the neural network perform 64-bit convolutions 22, 256-bit convolutions 26, and 512-bit convolutions 28. The most responsive nodes are generated by maxpooling layers 24, while final softmax layer 30 performs a normalized exponential function to limit the output range. Fully Connected FC layers 32 perform high-level reasoning by allowing each node to look at all inputs in a previous layer.

Such image processing may require 16 hidden layers in a neural network, and have over 200 Million weights. Thus the required size for weights memory 100 ((FIG. 1) is quite large.

Existing Deep neural networks may have a very high computational complexity in order to increase the neural network's accuracy. These large computational complexity and costs are often resolved by using industrial-sized computing clusters and high performance Graphic Processing Units (GPUs). However, such computing clusters and GPU's have a high power consumption.

Neural networks have traditionally been used with large-scale computing, such as mainframes and computer clusters. An image captured on an end-user device such as a smart phone can be sent to a remote mainframe or computing cluster for processing by a neural network. Then the results can be sent back to the smart phone.

However, it would be useful if such neural networks were available within the end-user devices themselves, such as smart phones, cameras, wearable devices, and robotic devices. These end-user devices often require a real-time response, low latency, and have memory and power consumption constraints.

One solution is to add dedicated hardware to the end-user device. An Application-Specific Integrated Circuit (ASIC) that contains a neural network could be added to the end-user device. The ASIC can have a lower power consumption than a GPU, since the ASIC's neural network can be specific to a task or operation performed by the end-user device, while the GPU is general-purpose.

The gate count, die area, power consumption, and cost of a dedicated neural network is roughly proportional to the number and size of the weights, or the size of weights memory 100. The inventors desire to reduce the size of weights memory 100 and thus reduce the gate count, die area, power consumption, and cost of a dedicated neural network. The size or bit depth of each weight could be reduced, but the accuracy of the neural network would also be reduced.

What is desired is a neural network with a reduced size and cost. A neural network that is reduced in size and cost by selectively reducing the size or bit depth of weights is desirable. Reduction of the bit depth of weights is desired in a fashion that does not significantly reduce the accuracy of the neural network in computing its outputs. Reducing the bit depths of some weights while having a minimal impact on accuracy is desirable.

DETAILED DESCRIPTION

The present invention relates to an improvement in neural networks. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have discovered that the size or bit depths of weights in a neural network can be reduced to reduce the complexity, cost, and size of the neural network while still optimizing accuracy. Specifically, a bit-depth complexity penalty is added during optimization to urge a neural network towards a smaller weights memory. A numerical gradient of the size of the weights is used during optimization iterations. The inventors reduce the number of bits required for weights in a neural network through a training process, which can then be deployed in dedicated hardware such as in an ASIC. The smaller optimized neural network reduces the cost and size of the ASIC.

Figure 4:
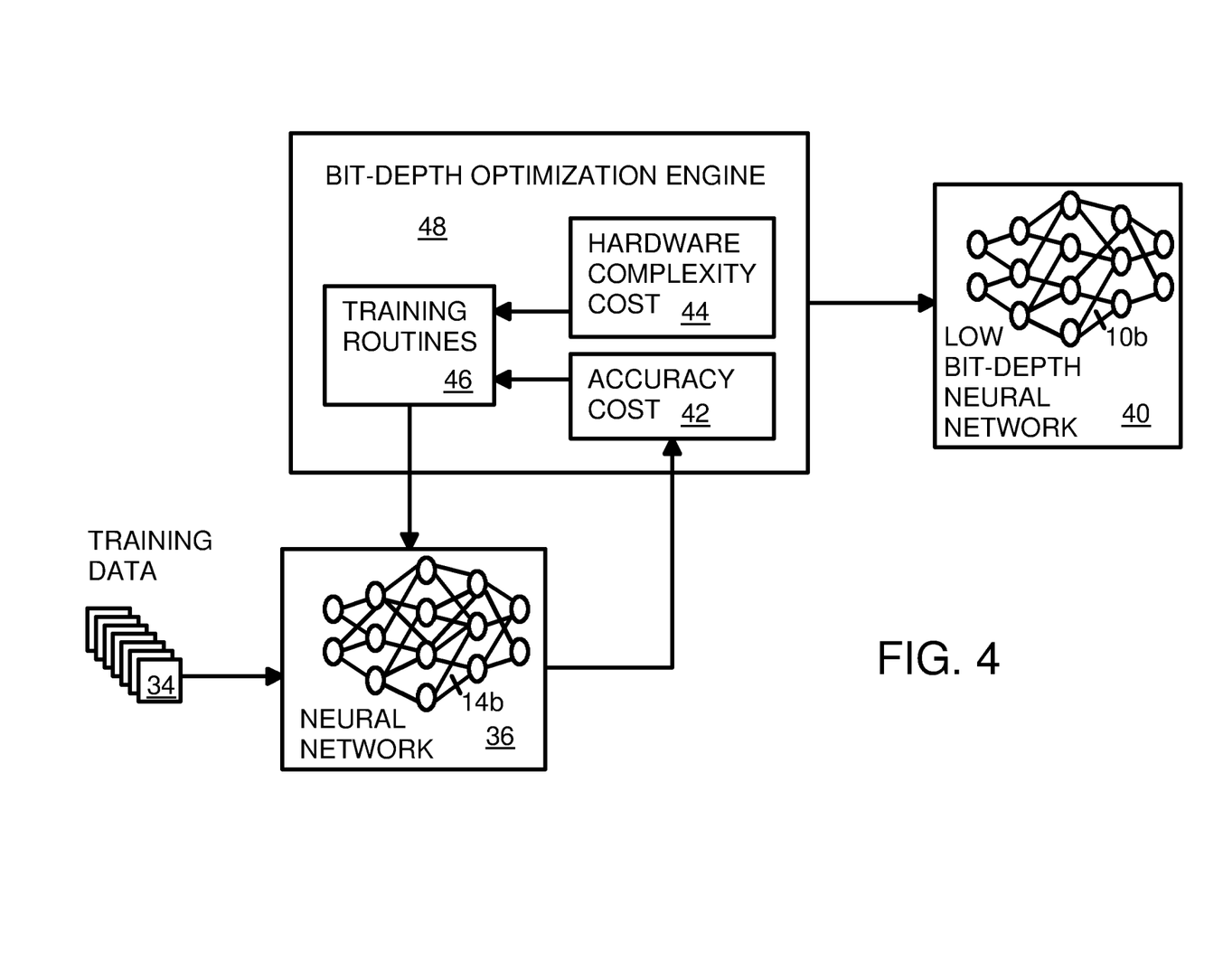
FIG. 4 shows a neural network optimizer.

FIG. 4 shows a neural network optimizer. Neural network 36 can be a neural network generated by design engineers for a particular application, or a generic neural network that is adjusted for a particular application. For example, the number of intermediate or hidden layers in the neural network may be adjusted for a particular application, and the type of operations performed in nodes and the connectivity among nodes may be adjusted for certain applications or problems to be solved. For example, a generic neural network might be expanded to 10 layers for the facial recognition application of FIGS. 2, or to 16 layers for the image processing application of FIG. 3.

The weights used in neural network 36 may have initial values such as 0 to 16K−1, which can be represented by a 14-bit weight. Training data 34 is input to neural network 36 when training routines 46 are executed, allowing the output of neural network 36 to be evaluated. One method to evaluate the quality of the output is to compute costs. Accuracy cost generator 42 generates an accuracy cost that is a measure of how close to the expected results the current cycle's output is. A Mean Square Error (MSE) may be generated by squaring the individual output differences with the expected value for that output, and averaging or summing these squares for all outputs.

Another cost is the hardware cost of neural network 36. In general, accuracy can be improved by increasing the amount of hardware available in neural network 36, so there is a tradeoff between hardware cost and accuracy cost. Typical hardware cost factors that can be computed by hardware complexity cost generator 44 include a weight decay function to prevent over-fitting when adjusting weight ranges, and a sparsity function to improve the structure and regularity.

Hardware complexity cost generator 44 also includes a new cost component that examines the number of binary bits required to represent a weight. Traditional cost methods treat weights as a continuum. Instead, hardware complexity cost generator 44 quantizes weight costs. The weight cost is calculated based on the number of binary bits required to represent the weight, rather than the weight's numeric value.

The accuracy cost from accuracy cost generator 42 and the hardware cost from hardware complexity cost generator 44 are both used to adjust the weights for the next cycle of training by training routines 46. The updated weights are applied to neural network 36 and training data 34 again is input to neural network 36, which generates a new set of results that has its costs generated by accuracy cost generator 42 and hardware complexity cost generator 44. Many cycles of adjusting weights and re-calculating costs are performed until a desired endpoint is reached. Then bit-depth optimization engine 48 outputs neural network 36 with the final weights as low-bit-depth neural network 40.

As an example, the average number of bits for each weight in neural network 36 is 14 bits. Bit-depth optimization engine 48 reduces this average bit-depth to 10 bits in low-bit-depth neural network 40, a reduction of 4 binary bits. This is a 28% reduction in the storage requirements for weights in weights memory 100 (FIG. 1).

Figure 5:
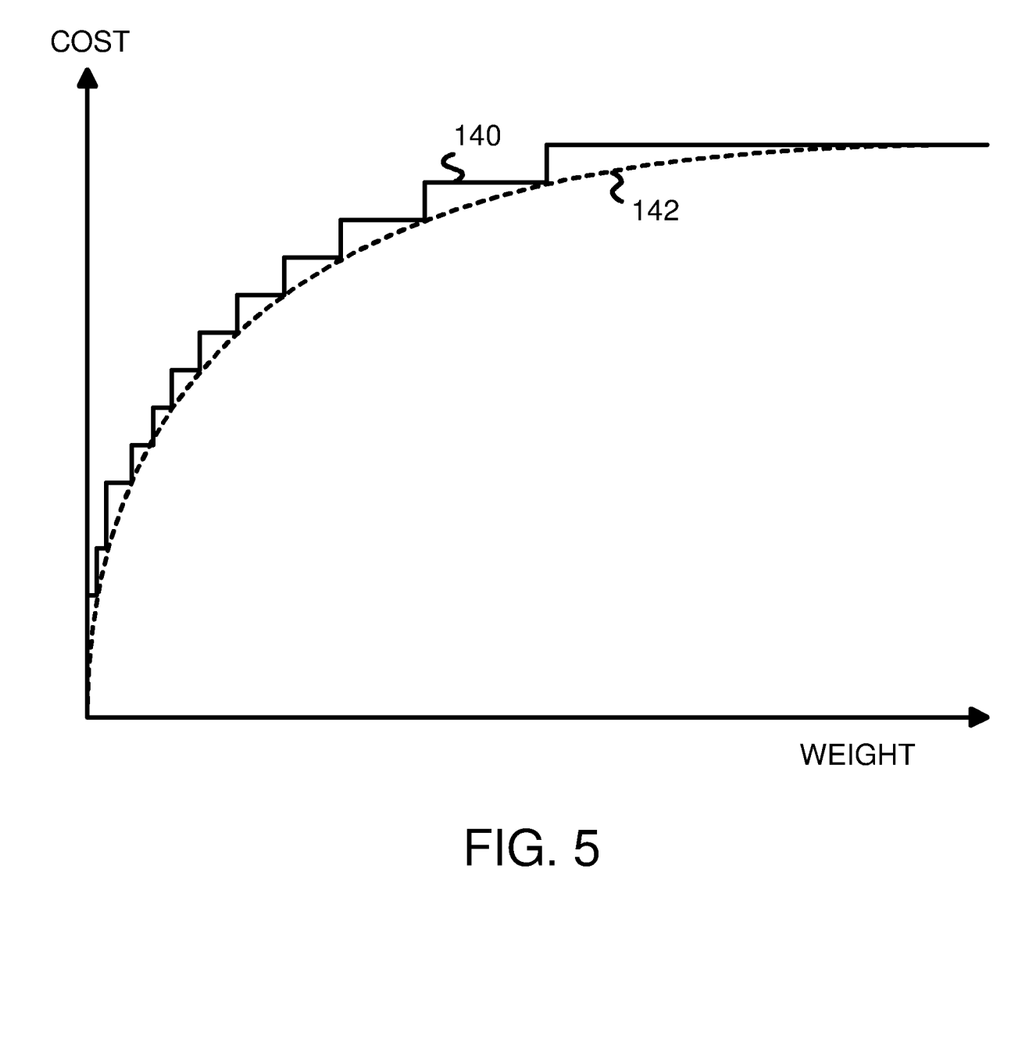
FIG. 5 is a graph highlighting quantized bit-depth weight costs.

FIG. 5 is a graph highlighting quantized bit-depth weight costs. The cost for a single weight is shown. As shown earlier in FIGS. 2-3, a neural network can have more than 100 million weights.

Traditional weight cost curve 142 has a steadily increasing cost as a weight value increases. Quantized weight cost curve 140 has steps. These steps occur each time the number of binary bits required to represent the weight value is increased.

For example, a weight could have a value of 36. This value requires 6 binary bits. If the weight value is lowered to 34, the traditional weight cost decreases, but it still requires 6 binary bits, so the quantized weight cost does not change.

However, when the weight changes from 36 to 31, the number of binary bits required decreases from 6 to 5, since 5 binary bits can cover values from 0 to 31. While the traditional weight shown by traditional weight cost curve 142 decreases by a small amount, the quantized weight cost shown by quantized weight cost curve 140 drops by a large amount as it falls over a step.

The steps in quantized weight cost curve 140 occur where the number of binary bits changes. These steps occur at powers of 2, such as at weight values of 16, 32, 64, 128, 256, 512, 1024, 2048, 4096, 8192, ... 65536, ..., etc. A weight value of 1024 (11 bits) has a cost that significantly decreases when the weight decreases by just 1 to 1023 (10 bits), but a weight value of 1023 does not have any change in quantized weight cost until reaching 511, since values from 1023 to 512 require 10 binary bits.

Figure 6A:
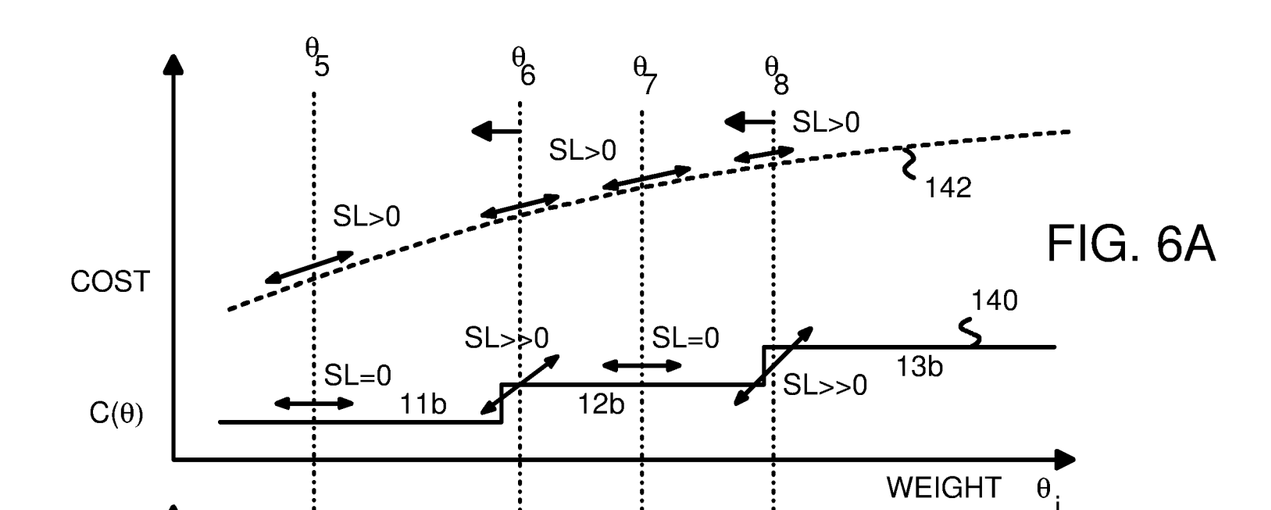
FIGS. 6A-B highlight selection of weights for reduction during training using a quantized weight cost curve.
Figure 6B:
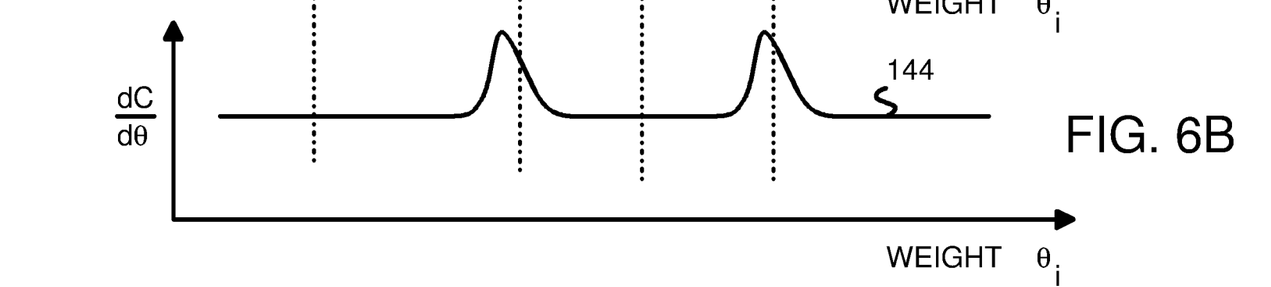

FIGS. 6A-B highlight selection of weights for reduction during training using a quantized weight cost curve. In FIG. 6A, sections of quantized weight cost curve 140 and traditional weight cost curve 142 are enlarged from FIG. 5 and offset for clarity. A step from 11 bits to 12 bits is shown on quantized weight cost curve 140, and another step from 11 bits to 12 bits.

Four individual weights $\theta_5$, $\theta_6$, $\theta_7$, and $\theta_8$ are shown. All four weighs have about the same slope SL or gradient of traditional weight cost curve 142, so all are about equal candidates for reducing their weight values during training using traditional cost optimization.

Weights $\theta_5$ and $\theta_7$ are far from any steps in quantized weight cost curve 140. the slopes near the values of weights $\theta_5$ and $\theta_7$ have near-zero values since quantized weight cost curve 140 is flat between steps. Thus there is little or no reduction in costs when weights $\theta_5$ and $\theta_7$ are chosen for reduction.

However, weight $\theta_6$ is near the step from 11 to 12 bits in quantized weight cost curve 140. The slope of quantized weight cost curve 140 is large for two points before and after the step.

When the range used to calculate the slope includes one point before and one point after the step, a large slope or gradient is calculated.

Gradients of the costs can be used to select which weights are the best choices for reduction during training optimization. Weights having large gradients are chosen over weights with small gradients, since a large reduction in hardware cost can be achieved for what is likely a small reduction in accuracy.

Likewise, weight $\theta_5$ is near the step from 12 to 13 bits in quantized weight cost curve 140. Weight $\theta_5$ has a large slope SL>>0. Since weights $\theta_6$ and $\theta_5$ are near steps, and have large gradients, weights $\theta_6$ and $\theta_5$ are preferentially selected by bit-depth optimization engine 48 over weights $\theta_5$ and $\theta_7$ that have zero slopes. Bit-depth optimization engine 48 will reduce the values of weights $\theta_6$ and $\theta_5$ slightly so that they are shifted to the left in FIG. 6A and occur before the steps in quantized weight cost curve 140. The number of bits required to store these weights has been reduced by 1 bit each. Weights $\theta_5$ and $\theta_7$ remain unchanged, so no reduction in accuracy occurs for them.

FIG. 6B shows spikes in the cost gradient that occur at steps when the number of binary bits changes. Gradient curve 144 is flat for long ranges of weight values between steps. A spike in gradient curve 144 occurs just to the right of each step in quantized weight cost curve 140. This spike indicates that the slope or gradient of quantized weight cost curve 140 changes dramatically when the number of binary bits drops.

Hardware complexity cost generator 44 can generate the gradient of quantized weight cost curve 140 for each weight, and bit-depth optimization engine 48 can search for weights with high cost gradients and select these for reduction during training optimization. Over many cycles of selection, weights can be reduced and traded off with accuracy until an optimal choice of weight values is obtained for low-bit-depth neural network 40.

The inventors realize that there are long ranges of weight values that have the same hardware cost, since they require the same number of binary bits. Hardware complexity cost generator 44 (FIG. 4) accounts for the bit-depth cost of weights. During training, the choice of which weights to reduce is altered to preferentially select weights that are just after drop offs (steps) in quantized weight cost curve 140. A small change in these weights can have a much larger reduction in hardware costs than large changes in weights that are far away from the next step in quantized weight cost curve 140.

Figure 7A:
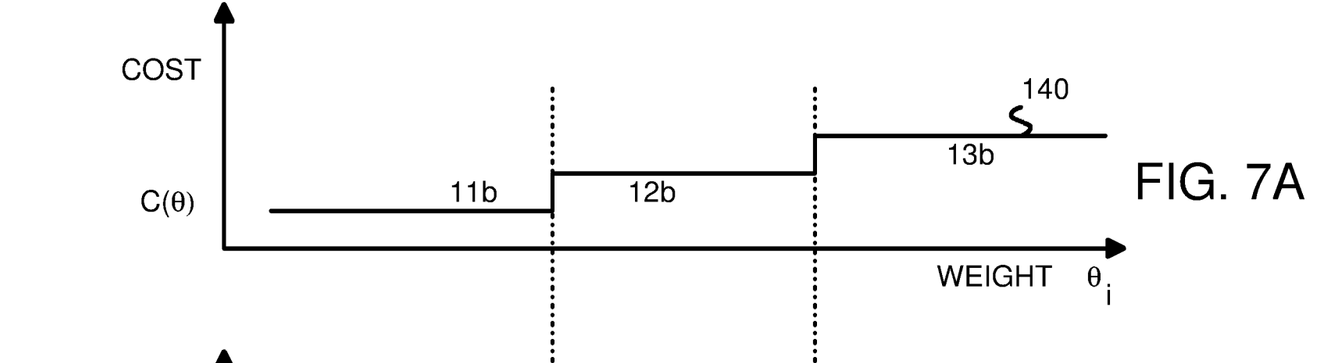
FIGS. 7A-C show distribution of weight values using the bit-depth optimization engine.

FIGS. 7A-C show distribution of weight values using the bit-depth optimization engine. In FIG. 7A, quantized weight cost curve 140 is shown. Hardware costs jump at steps when the number of binary bits increase. Bit-depth optimization engine 48 selects weights that have weight values just before (to the right of) steps in quantized weight cost curve 140, and reduces these values slightly. If a large drop in accuracy occurs due to a weight being critical, this change can be undone in further cycles of training, but in general and in aggregate, weights are reduced in value slightly but are reduced more dramatically in the bit depths and storage requirements.

Figure 7B:
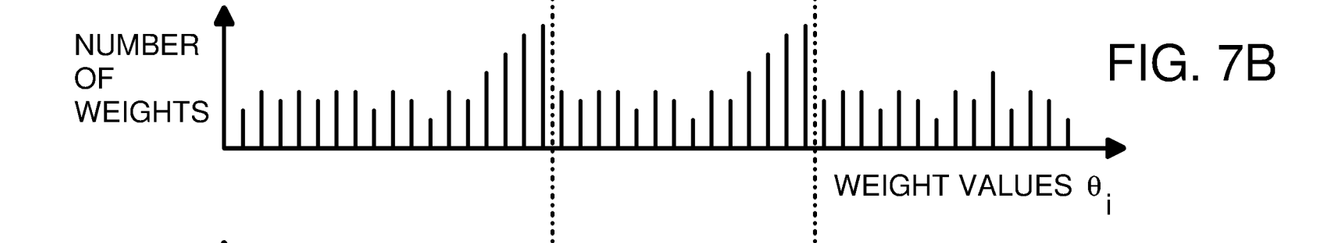
Figure 7C:
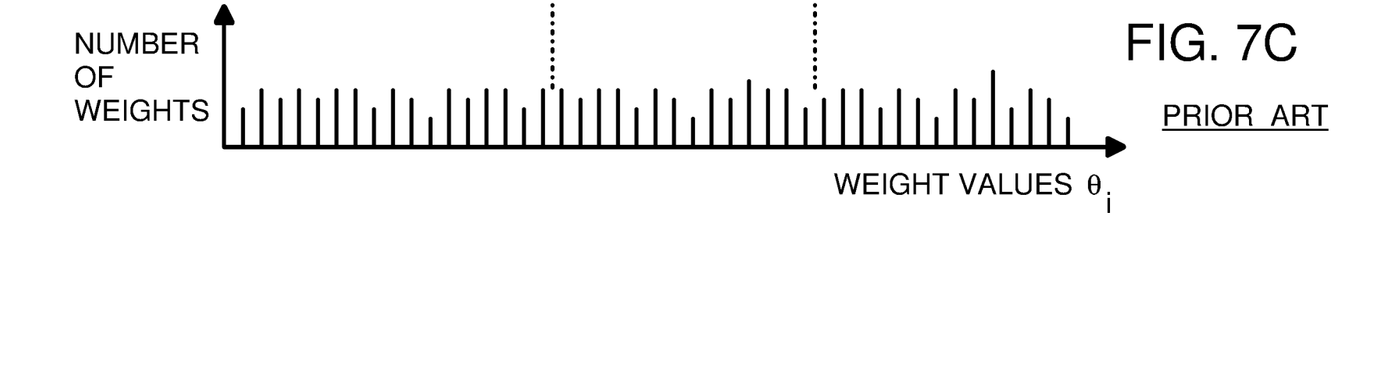

In FIG. 7B, bit-depth optimization engine 48 has preferentially selected weights near steps in quantized weight cost curve 140, and these weights have been reduced. The distribution of weight values shows a spike just after (to the left of) steps in quantized weight cost curve 140. Weights to right of a step were selected and reduced to put them to the left of the step. Thus there are more weighs just after a step than before a step, as FIG. 7B shows. FIG. 7C shows the prior art distribution. Using traditional weight cost curve 142, steps are ignored, so the distribution of weights is relatively constant both before and after a step in quantized weight cost curve 140.

Bit-depth optimization engine 48 has altered the distribution of the millions of weights in low-bit-depth neural network 40. Weights tend to have values just under steps in binary bits. Fewer weights have values just before steps, since these were candidates for reduction during training and optimization, and many have been shifted to after the step.

Figure 8:
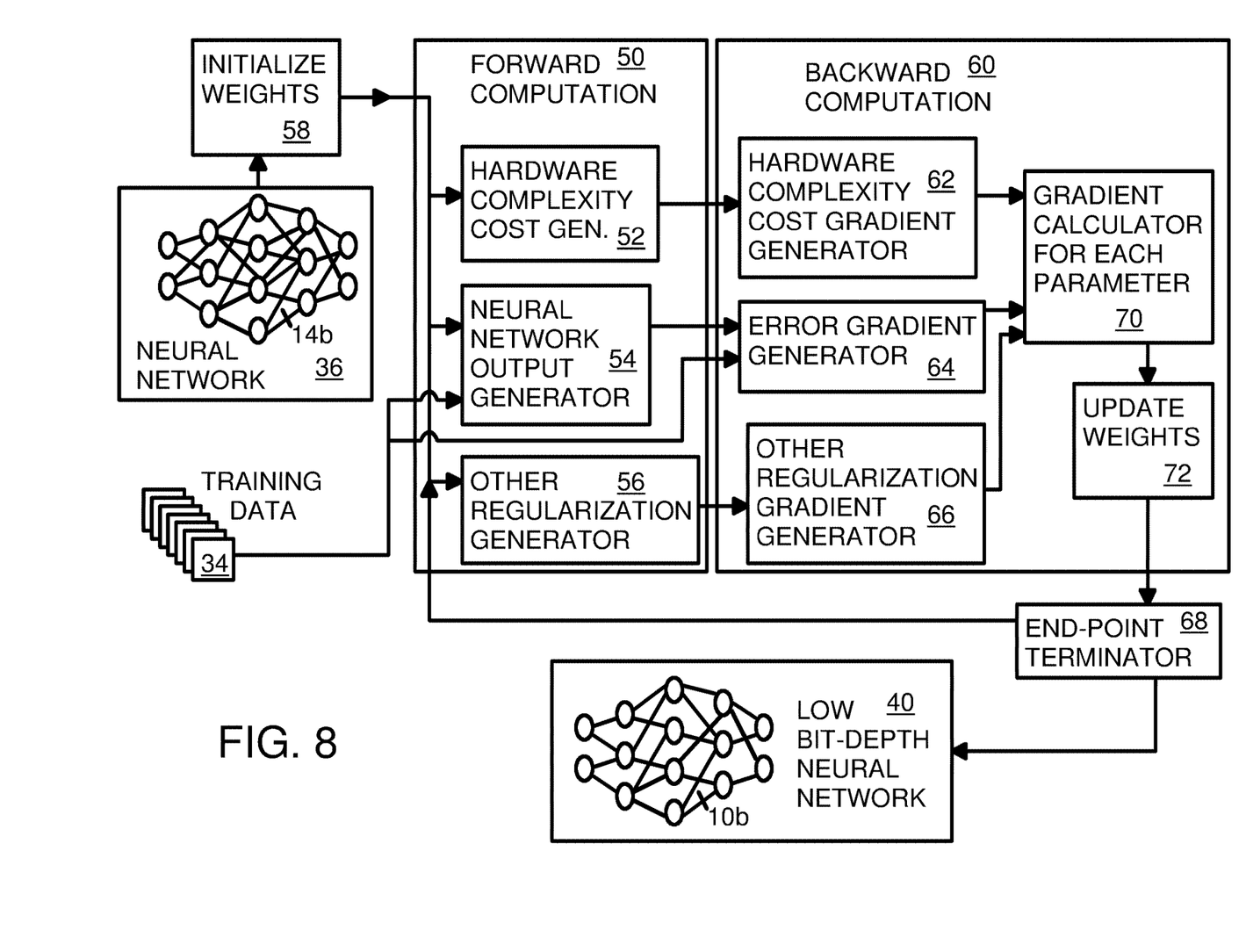
FIG. 8 is a more detailed block diagram of a bit-depth optimization engine.

FIG. 8 is a more detailed block diagram of a bit-depth optimization engine. Weights for neural network 36 are initialized by weight initializer 58 and these initial weights are input to neural network output generator 54, which uses the network of nodes and operations defined by neural network 36 with these initial weights to operate on training data 34 to generate results or outputs of neural network 36. These results are compared to expected outputs for training data 34 to generate error terms or an accuracy cost for each weight. During subsequent cycles, updated weights 72 are applied to neural network output generator 54.

Hardware complexity cost generator 52 generates hardware costs for neural network 36 based on the current weights, either initial weights or updated weights 72. Overall hardware costs can be approximated as proportional to the cost of weights memory 100, which can be approximated as the aggregate number of bits required for all weights in neural network 36.

Forward computation 50 also includes regularization generator 56, which generates other hardware cost, such as sparsity or regularity of neural network 36. Forward computation 50 generates hardware and accuracy costs of neural network 36 using the current values of updated weights 72.

Backward computation 60 receivers the costs from forward computation 50 and generates gradients. The gradients can be used to select which weights to adjust, such as shown in FIGS. 6A-B. The accuracy cost or error for each weight generated by neural network output generator 54 is input to error gradient generator 64, which generates the error gradient for each weight. Weights having higher error gradients are poor choices for reduction in weight bit-depths, since accuracy suffers disproportionately.

The hardware costs from hardware complexity cost generator 52 are input to hardware complexity cost gradient generator 62. These hardware costs include the bit-depth costs. The hardware cost gradient for each weight is calculated by hardware complexity cost gradient generator 62, and these gradients collected by weights selector 70. Some gradients, such as a gradient of error, can be back propagated to find the gradient over each parameter using a chain rule. Regularization costs from other regularization generator 56 are input to other regularization gradient generator 66, which generates gradients for regularization costs.

Weights selector 70 combines gradients from hardware complexity cost gradient generator 62, error gradient generator 64, and other regularization gradient generator 66 to decide which weights to adjust. Weights selector 70 trades off accuracy errors and hardware errors and chooses the best candidates of weights for adjustment. Weights selector 70 adjusts these weights to generate updated weights 72.

End-point terminator 68 compares the aggregate weight and accuracy costs to a target and sends updated weights 72 back to hardware complexity cost generator 52, neural network output generator 54, and other regularization generator 56 for another cycle or iteration when the target has not yet been met. Once the target is reached, the final set of updated weights 72 are applied to neural network 36 to generate low-bit-depth neural network 40.

The 14-bit average bit-depth in neural network 36 has been reduced to a 10-bit average bit-depth for low-bit-depth neural network 40. This average reduction of 4 binary bits per weight is a huge savings in hardware cost when hundreds of millions of weights are used. This 4-bit reduction is a 28% reduction in the storage requirements for weights in weights memory 100 (FIG. 1). Interconnect of weight values and logic to process these weight values at each node are likewise reduced.

Figure 9:
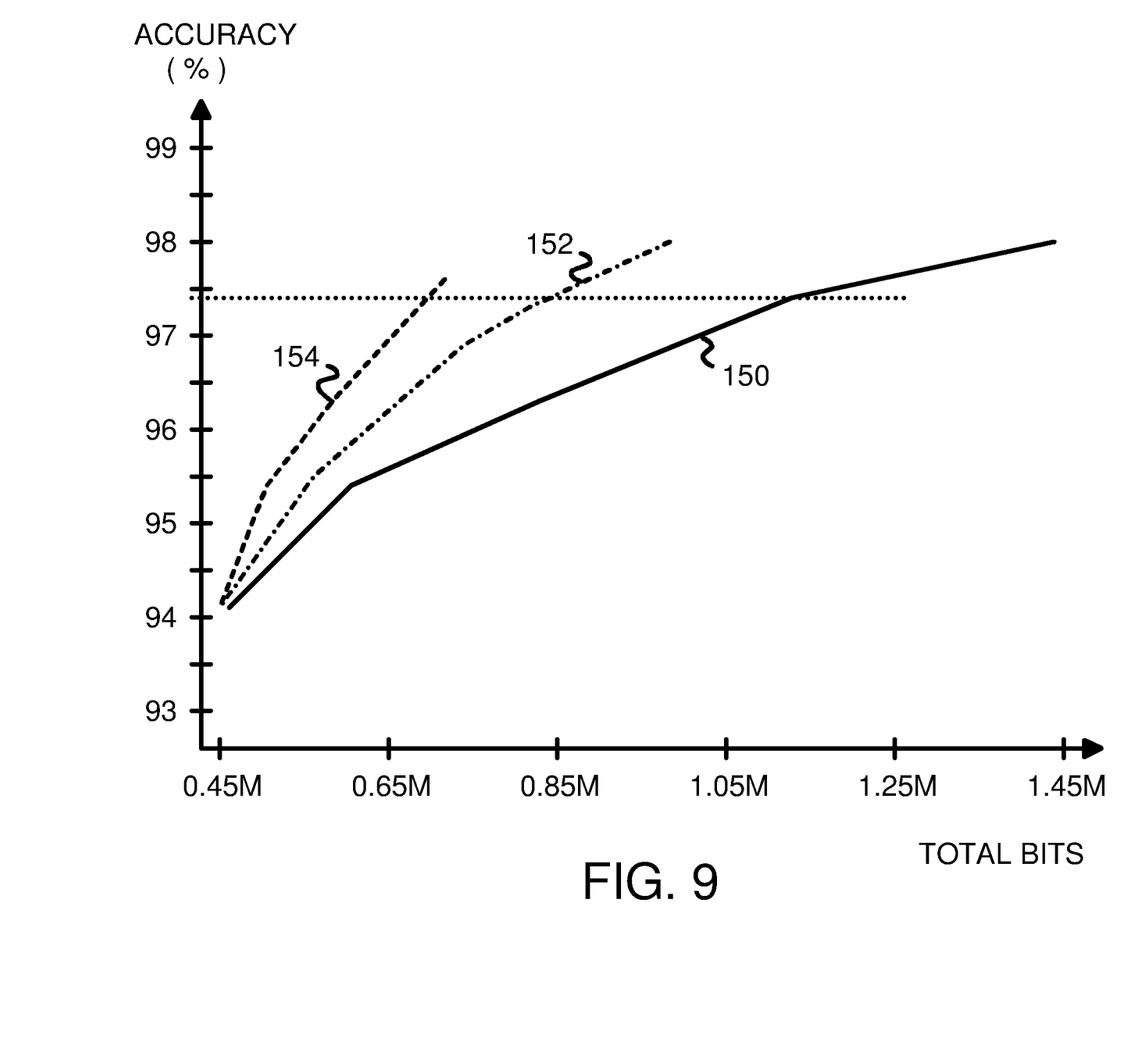
FIG. 9 is a graph showing reduction in weight hardware costs using the bit-depth optimization engine.

FIG. 9 is a graph showing reduction in weight hardware costs using the bit-depth optimization engine. This example uses the Mixed National Institute of Standards and Technology (MNIST) datasets of handwritten digital numbers as training data 34.

Accuracy is shown as a function of the total number binary bits required to store all of the weight values in low-bit-depth neural network 40. Traditional curve 150 shows accuracy as a function of weights when no bit-depth cost optimization is included. Curves 152, 154 show accuracy vs. weight cost using bit-depth optimization engine. Curve 152 uses a scaling parameter $\gamma$ of $5 \times 10^{-7}$, while curve 154 uses a scaling parameter $\gamma$ of $1 \times 10^{-6}$. The scaling parameter $\gamma$ is multiplied by the bit-depth gradient cost, such as curve 144 of FIG. 6B.

There is a trade-off between bit-depth reduction and accuracy. Bit-depth optimization engine 48 shifts the curves to the left, indicating lower hardware costs for the same accuracy. For a 97.4% accuracy, hardware costs are reduced from 1.1 M bits for traditional curve 150 to 840K bits for curve 152 and to 700K bits for curve 154. In this example, floating-point weight values are quantized to 15-bit binary values.

Theory of Operation

The following is a theory of operation with mathematical models and approximations. These models are for informative purposes only and are not to limit the invention defined by the claims. A typical neural network training involves minimizing a cost function $J(\theta)$:

$$J(\theta) = E(\theta) + \lambda P(\theta) + \beta KL(\theta). \tag{1}$$

Equation (1) is comprised of an error metric $E(\theta)$, such as a Mean Square Error (MSE), a weight decay function $P(\theta)$ to prevent over-fitting, and a sparsity function $KL(\theta)$ defined as the Kullback-Leibler (KL) divergence. $\theta$ is a one-dimensional vector containing all of the parameter weights in the neural network. □ serves as the decision variable in the optimization problem. $\lambda$ controls the magnitude of the weight decay term and $\beta$ controls the magnitude of the sparsity term. Specifically, the weight penalty term can be defined as $$E(\theta) = \sum_i (\theta_i)^2, \tag{2}$$

where $\{\theta_i\} \in \theta$ represent the elements of the parameter vector.

The inventors modify the cost function in Equation (1) to minimize hardware complexity costs due to bit-depths of weights. The weight penalty term in Equation (2) cannot directly address the bit boundary characteristics. Hence, a bit depth penalty, $\gamma C(\theta)$ is added to the cost function in Equation (1), as formulated by $$J(\theta) = E(\theta) + \lambda P(\theta) + \beta KL(\theta) + \gamma C(\theta), \tag{3}$$

where the bit depth penalty term, $C(\theta)$, is defined as the sum of bit depths of all parameters (weights and biases) of the neural network. Specifically, the absolute value of one parameter, $\theta_i$, is divided by the quantization step size $(2r/2^b)$, which is the smallest assumed unit of precision. r is defined as a magnitude which captures approximately the central 95% of values of parameters in neural network. This entails constraining certain neural network model parameters to a given range $[-r, r]$ and linearly quantizing all intermediate values into $2b$ bins, yielding step sizes of $2r/2^b$, where b is the quantization-bit ranging from 8 to 16 generally, since weights are generally binary values using somewhere between 8 and 16 bits to represent them. Then, the logarithm is taken to compute the number of bits required to represent this integer magnitude. Finally, one bit is used for the sign of the integer magnitude. The penalty term is defined by $$C(\theta) = \sum_i \left[ \log_2 \left( |\theta_i| / \frac{2r}{2^b} \right) + 1 \right] \tag{4}$$

At each optimization iteration, the following actions are taken:

calculate and generate a cost $J(\theta)$: forward propagate data using $\theta$ to get a value from the cost $J(\theta)$;

calculate and generate a gradient $dJ(\theta)/d\theta$: an analytic gradient $dJ(\theta)/d\theta$ is calculated via the back propagation algorithm. Update the neural connection weights with fixed-point representation by changing the weights using the gradient generated; and repeatedly perform the above steps until a termination condition is met.

At the end of each optimization iteration, θ is updated with α defined as the step size (typically α=1), as formulated by $$\theta^{t=1} = \theta^t - \alpha \frac{dJ(\theta^t)}{d\theta^t}, \quad (5)$$

where t represents the iteration in the training.

The gradient update in (5) incorporates the bit depth penalty γC(θ), as formulated by $$\frac{dJ(\theta)}{d\theta} = \frac{dE(\theta)}{d\theta} + \lambda \frac{dP(\theta)}{d\theta} + \beta \frac{dKL(\theta)}{d\theta} + \gamma \frac{dC(\theta)}{d\theta}, \quad (6)$$

where λ and β control the magnitudes of the weight decay term and the sparsity term, and γ controls the magnitude of the bit-depth penalty. To compute the gradient of sthe complexity term, dC(θ)/dθ, the numerical gradient is calculated using the central finite difference approximation, as formulated by $$\frac{dC}{d\theta} = \frac{C(\theta + \epsilon) - C(\theta - \epsilon)}{2\epsilon}, \quad (7)$$

where ∈ is a parameter defined as ∈=0.02 for the Mixed National Institute of Standards and Technology (MNIST) datasets. An implication of Equation (7) is that the gradient of C(θi) is only non-zero if the θi within E changes leads the change of the bit depth.

[Para 87] For illustration, FIG. 5 showed the cost of the logarithm weight penalty, log 2(P(θi)0.5/(2r/2b))+1, and the cost of bit depth penalty, C(θi). In FIG. 5, the cost function of the bit depth penalty jumps at the bit boundary in order to minimize the number of bits. FIG. 5 demonstrated how a bit-depth penalty encourages weights near bit depth boundaries to take lower bit depth values.

Hardware Cost Reduction

Figure 10:
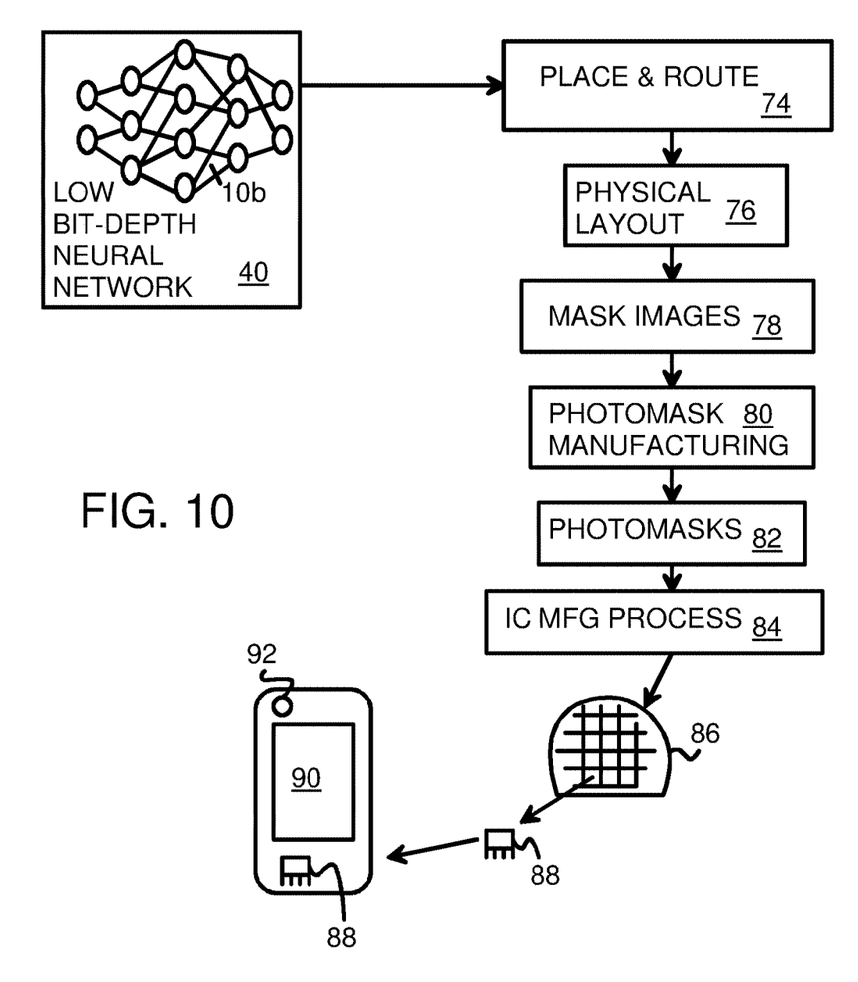
FIG. 10 shows a design and manufacturing process that creates integrated circuits that have neural networks that have bit-widths of weights optimized.

FIG. 10 shows a design and manufacturing process that creates integrated circuits that have neural networks that have bit-widths of weights optimized. Design engineers create the high-level design of neural network 36, and input training data 34 with expected outputs to neural network 36 over many training cycles to optimize bit-depths of weights using bit-depth optimization engine 48 (FIG. 4). The result of optimization is low-bit-depth neural network 40.

Low-bit-depth neural network 40, and other circuits on this chip, are converted to a netlist of gates and wires and then converted to physical layout 76 by place and route 74. Physical layout 76 specifies physical x, y locations on each die where various components will be located on the finished Integrated Circuit (IC) die. Physical layout 76 is converted to many layers of images that specify where gates are located, locations of metal wires, vias, and contacts between layers, and locations of oxides and diffusion areas on the substrate. Mask images 78 typically include one image for each layer.

A mask-making machine reads mask images 78 or another design file and physically writes or burns these images onto photomasks 82. Photomasks 82 are a tangible product that is produced as a result of the optimization software or routines that generates low-bit-depth neural network 40, which is part of the netlist that is eventually converted to mask images 78 of the actual transistor gates and wiring by layout software. While the optimization software can be executed on a generic computer, creating photomasks 82 requires the use of specialized machines that write the layout data onto individual masks, such as by a light or an electron beam that is switched on and off by the layout data while being scanned in a rasterized pattern over a layer of unexposed photo-resist polymers that is placed over a blank photomask glass plate. The photo-resist is exposed in certain locations by the light or electron beam and unexposed in other regions. The exposed plates may then be washed in a chemical developer bath to remove either the exposed or the unexposed regions to create photomasks 82.

Multiple plates of photomasks 82, one for each semiconductor process layer, are generated by the photomask machine during photomask manufacturing 80. The plates of photomasks 82 are then sent to the semiconductor factory (fab) and loaded into photo-masking machines, where light passing through photomasks 82 exposes photo-resist resins on semiconductor wafers during IC manufacturing process 84. After processing through many layers of exposure by photomasks 82, and other processing such as ion implantation, diffusion, oxide growth, polysilicon and metal deposition, via and contact etching, and metal and poly etching, wafer 86 is produced by IC manufacturing process 84. Wafer 86 is a silicon, Gailum-Arsinide, or other semiconductor substrate with patterned layers formed on its surface. Many chips are produced on each wafer 86. After initial wafer-sort testing, wafer 86 is sawed into dice that are placed into packages to produce IC 88.

Thus low-bit-depth neural network 40, generated by bit-depth optimization engine 48, controls a series of steps in the manufacturing processes that eventually result in photomasks 82 and IC 88. Very specialized machinery and computers that control these machines are themselves ultimately controlled or directed by the data in low-bit-depth neural network 40 to cause a specific IC 88 chip to be produced. Bit-depth optimization engine 48 generates low-bit-depth neural network 40 by modifying the design of neural network 36 created by human design engineers by adjusting bit depths of weights.

IC 88 can be an ASIC or module that is fitted into an end-user device such as smart phone 90. Smart phone 90 may include camera 92 that captures images that are processed on smart phone 90 using a neural network inside IC 88. The neural network can perform operations such as facial recognition or image processing locally on smart phone 90. A remote neural network on a mainframe or computing cluster does not need to be used.

Alternate Embodiments

Several other embodiments are contemplated by the inventors. For example, low-bit-depth neural network 40 could have many applications, such as for real-time image recognition for use with self-driving cars and other driver-assistance systems, small medical wearable devices that analyze a patient's vital signs, facial recognition, other image processing, speech recognition, handwriting recognition, image de-noising, image super-resolution, object detection, image/video generation, etc.

Some embodiments may not use all components. Additional components may be added. The bit-depth optimization engine may use various cost generators, such as a weight decay term that prevents weights from growing too large over many cycles of training optimization, a sparsity penalty that encourages nodes to zero their weights, so that only a small fraction of total nodes are effectively in use. The remaining small fraction of nodes are the most relevant. While equations with various cost functions have been described in the theory of operation, many substitutions, combinations, and variations are possible. Other variations and kinds of cost terms can be added to bit-depth optimization engine 48. The values of the relative scaling factors for the different cost functions can be adjusted to balance the impact of the various functions.

Floating-point values can be converted to fixed-point values or to binary values. While binary-value weights have been shown, various encodings could be used, such as two's complement, Huffman coding, truncated binary encoding, etc. The number of binary bits required to represent a weight value may refer to the number of bits regardless of the encoding method, whether binary encoding, gray-code encoding, fixed-point, offset, etc.

Weights may be limited to a range of values. The range does not necessarily have to extend down to 0, such as a range of 511 to 0. The weight's value may be offset to fit within a binary range, such as a weight having a range of 10511 to 10000, which could be stored as a 9-bit binary word, with an offset of 10000 added to the binary word to generate the actual weight value. Ranges may be adjusted during optimization. The offset may be stored or may be hardwired into the logic of low-bit-depth neural network 40.

Many variations are possible for training routines 46. Optimization may first determine a number of hidden or intermediate levels of nodes, then proceed to optimize weights. The weights may determine an arrangement or connectivity of nodes by zeroing some weights to cut links between nodes. The sparsity cost may be used for initial cycles of optimization when structure is optimized, but not for later cycles of optimization when weight values are being fine-tuned. A sigmoid function may be used for training hidden layers. Lookup tables may be used to implement complex functions rather than an Arithmetic-Logic-Unit (ALU) to speed up processing.

While MINST datasets have been used for measuring the improvement that bit-depth optimization engine 48 can provide, other training data 34 may be used. Different amounts of cost reduction will occur for different applications and training sets. A wide variety of structures while different numbers and arrangements of hidden layers may be used for input neural network 36. The particular application may suggest certain kinds of neural networks or arrangements for neural network 36 or a generic neural network 36 may serve as the starting point. Autoencoders, automax and softmax classifiers, and other kinds of layers may be inserted into the neural network. The entire optimization process may be repeated several times, such as for different initial conditions, such as for different number of bits to quantize floating point values or other parameters, different precisions, different scaling factors, etc. The endpoint may be set for various combinations of conditions, such as a desired final accuracy, an accuracy-hardware cost product, a target hardware cost, etc.

While the actual cost of low-bit-depth neural network 40 depends on many factors, such as the number of nodes, weights, interconnection, control, and interfaces, the inventors approximate the cost as being proportional to the aggregate of the weights. The total number of binary bits used to represent all weights in low-bit-depth neural network 40 is a measure of the hardware cost, even if only an approximation.

The hardware complexity cost gradients may have large values of the gradient that are at least double the small values. The large values may occur when the weight is within 10% of the bit-depth step. Other threshold for large gradient values may be used, and distances to bit-depth steps. Gradient values may be scaled and otherwise altered before or after comparison.

Many variations of IC semiconductor manufacturing processes are possible. Photomasks 82 may be made with a variety of specialty machines and processes, including direct writing to burn off a metalized layer rather than a photoresist. Many combinations of diffusions, oxide growth, etching, deposition, ion implant, and other manufacturing steps may have their resulting patterns created on the IC controlled by photomasks 82.

Bit-depth optimization engine 48 and other components may be implemented in a variety of technologies, using various combinations of software, hardware, firmware, routines, modules, functions, etc. The final product, low-bit-depth neural network 40, can be implemented in an Application-Specific Integrated Circuit (ASIC) or other hardware to increase processing speed and lower power consumption.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An Integrated Circuit process (IC) manufacturing process comprising:
applying an initial set of weights to a neural network, the weights specifying connections among nodes in the neural network;
(a) applying training data to the neural network to generate neural network results;
(b) generating an accuracy cost from the neural network results;
(c) generating hardware complexity costs for the weights, wherein the hardware complexity cost for a weight is generated from a number of binary bits required to represent the weight;
(d) selecting weights for reduction by preferentially selecting weights near bit-depth steps;
wherein a number of binary bits required to represent a weight that is located near a bit-depth step is reduced by one binary bit while a number of binary bits required to represent a weight that is not located near a bit-depth step is not reduced for a weight reduction;
(e) reducing each of the selected weights to generate updated weights;
(f) applying the updated weights to the neural network and repeating steps (a) to (f) until a target is reached;
when the target is reached, generating a low-bit-depth neural network by modifying the neural network to include the updated weights;
converting the low-bit-depth neural network and the updated weights to a manufacturing control file;
inputting the manufacturing control file into a computer-controlled manufacturing machine;
manufacturing an IC product with the low-bit-depth neural network using a manufacturing process that includes using the computer-controlled manufacturing machine that receives the manufacturing control file specifying IC product with the low-bit-depth neural network,
whereby the IC product has the low-bit-depth neural network generated by preferentially selecting weights for reduction that are near the bit-depth steps.

2. The IC manufacturing process of claim 1 wherein manufacturing the IC product further comprises:
converting the IC product with the low-bit-depth neural network and the updated weights to a design file for use by a photomask writing machine;
using the photomask writing machine under control of the design file to write images of the IC product to a plurality of photomasks, the images including images of the low-bit-depth neural network; and
using the plurality of photomasks to print the images onto a semiconductor substrate during steps in an IC manufacturing process to build a plurality of dice of the IC product onto the semiconductor substrate,
whereby the IC product has the low-bit-depth neural network generated by preferentially selecting weights for reduction that are near the bit-depth steps.

3. The IC manufacturing process of claim 1 further comprising:
generating a hardware complexity cost gradient for weights, the hardware complexity cost gradient for a particular weight having a larger value when the particular weight is nearer the bit-depth step than when the particular weight is farther from the bit-depth step.

4. The IC manufacturing process of claim 3 wherein selecting weights for reduction by preferentially selecting weights near bit-depth steps further comprises:
examining the hardware complexity cost gradient and selecting a weight for reduction having a larger hardware complexity cost gradient than a weight, not selected for reduction;
wherein an average of the hardware complexity cost gradient for weights selected for reduction is larger than an average of the hardware complexity cost gradient for weights that are not selected for reduction.

5. The IC manufacturing process of claim 4 wherein an average of the hardware complexity cost gradient for the weights selected for reduction is at least twice as large as an average of the hardware complexity cost gradients for weights that are not selected for reduction.

6. The IC manufacturing process of claim 4 wherein a change of one binary bit required to represent the weight produces a high hardware complexity cost gradient, while a low hardware complexity cost gradient is generated when the number of binary bits required to represent the weight does not change when the weight is changed.

7. The IC manufacturing process of claim 1 wherein the target is a combination of the accuracy cost and the hardware complexity cost.

8. A computer-implemented process to convert a neural network into a low-bit-depth neural network comprising:
applying an initial set of weights to the neural network, a weight having a weight value that indicates a strength of a connection between nodes within the neural network, the neural network having at least a thousand weights;
(a) inputting training data into the neural network while training routines are being executed;
(b) generating outputs from the neural network after the training data is being input while the training routines are being executed;
(c) comparing the outputs from the neural network to expected outputs to generate an accuracy cost for a current iteration of the training routines;
(d) generating a hardware cost for each weight in the neural network during the current iteration, wherein the hardware cost is a function of a number of binary bits required to represent the weight;
(e) generating a gradient of the hardware cost for each weight, the gradient having a large value when the weight is near a bit-depth step;
wherein the number of binary bits required to represent a weight that is located near a bit-depth step is reduced while a number of binary bits required to represent a weight that is not located near a bit-depth step is not reduced for a weight reduction;
(f) using a computer to identify selected weights from among the weights having the large values of the gradient;
(g) reducing each of the selected weights so that each selected weight requires one less binary bit to represent the weight;
(h) generating updated weights that include the selected weights that are reduced;
(i) comparing the accuracy cost and an aggregate of the hardware costs to a target, and applying the updated weights to the neural network and repeating steps (a) to (i) for another iteration when the target is not reached; and when the target is reached, applying the updated weights to the neural network to generate the low-bit-depth neural network;

whereby the low-bit-depth neural network has a lower aggregate hardware cost than the neural network before iterations of the training routines.

9. The computer-implemented process of claim 8 wherein the large value of the gradient is at least double the small value, and wherein the large value occurs when the weight is within 10% of the bit-depth step.

10. The computer-implemented process of claim 8 further comprising:

generating an accuracy cost for each weight in the neural network during the current iteration, wherein the accuracy cost is a measure of a loss in accuracy of the neural network when the weight is decreased;

generating a gradient of the accuracy cost for each weight, the gradient having a value determined by an amount that the weight changes the accuracy by when the weight is reduced.

11. The computer-implemented process of claim 10 wherein using a computer to identify selected weights from among the weights having the large values of the gradient of the hardware cost further comprises selecting weights also having a low value of the gradient of the accuracy cost.

12. A non-transitory computer-readable medium for storing computer-executable instructions, the computer-executable instructions when executed by a processor implementing a method comprising:

applying initial weights to connections between nodes in a neural network, a weight specifying a strength of a connection between nodes in the neural network;

(a) executing training routines that apply training data to inputs of the neural network;

(b) examining outputs of the neural network to generate error measurements;

(c) generating a hardware complexity cost from the weights applied to the neural network;

(d) generating an error gradient for weights from the error measurements;

(e) generating a hardware complexity cost gradient for a weight from the hardware complexity cost for the weight;

wherein the hardware complexity cost gradient has a value above a gradient threshold when a reduction in the weight causes the weight to require one less binary bit for representation;

wherein the hardware complexity cost gradient has a value below the gradient threshold when the reduction in the weight causes the weight to require a same number of binary bits for representation;

(f) selecting weights having a hardware complexity cost gradient above the gradient threshold as selected weights;

(g) reducing each of the selected weights to generate updated weights;

applying the updated weights to the neural network and performing additional iterations of steps (a) to (g) when a target endpoint has not been reached; and when the target endpoint has been reached, outputting the neural network with the updated weights as a low-bit-depth neural network that is specified by a design file;

wherein the design file is a computer-readable file that specifies the low-bit-depth neural network.

13. The computer-readable medium of claim 12 wherein the method further comprises:

converting the design file into a plurality of mask image files;

wherein the plurality of mask image files are computer-readable by a mask-making machine that generates a plurality of masks;

wherein the plurality of masks control printing of images specified in the plurality of mask image files onto a semiconductor substrate during a semiconductor manufacturing process to build an Integrated Circuit (IC) that has the low-bit-depth neural network.

14. The computer-readable medium of claim 12 wherein at least 80% of the weights are able to be represented by 8 to 16 binary bits.

15. The computer-readable medium of claim 12 wherein generating the hardware complexity cost comprises summing, over all weights, a number of bits required to represent each weight, wherein the hardware complexity cost is an aggregate sum of bit-depths for weights.

16. The computer-readable medium of claim 12 wherein the method further comprises:

signaling the target endpoint being reached when a predefined combination of the error measurements and a sum of the hardware complexity cost for all weights is below a target value.

17. The computer-readable medium of claim 12 wherein the method further comprises:

removing weights having an error gradient above an error threshold from the selected weights, whereby weights with the error gradients are not reduced.

18. The computer-readable medium of claim 12 wherein the method further comprises:

generating other regularization costs from the neural network and the weights applied to the neural network;

generating other regularization gradients from the other regularization costs;

using the hardware complexity cost gradient to refine selection of the weights selected as the selected weights.

19. The computer-readable medium of claim 18 wherein generating other regularization costs comprises generating a sparsity cost.

20. The computer-readable medium of claim 12 wherein the neural network has at least one hundred thousand weights.

* * * * *